MEANS FOR RECORDING THE READINGS OF AN INSTRUMENT OR GROUP OF INSTRUMENTS

Filed Aug. 10, 1954 7 Sheets-Sheet 1

Inventor
Edward Searles
By [signature]
Attorney

Dec. 31, 1957 E. SEARLES 2,818,321

MEANS FOR RECORDING THE READINGS OF AN INSTRUMENT OR GROUP OF INSTRUMENTS

Filed Aug. 10, 1954 7 Sheets-Sheet 2

Inventor
Edward Searles
By Webb, Mackey & Burden
Attorney

Dec. 31, 1957

E. SEARLES 2,818,321

MEANS FOR RECORDING THE READINGS OF AN INSTRUMENT OR GROUP OF INSTRUMENTS

Filed Aug. 10, 1954

7 Sheets-Sheet 3

Inventor
Edward Searles
By Webb, Mackey & Burden
Attorney

Dec. 31, 1957 E. SEARLES 2,818,321

MEANS FOR RECORDING THE READINGS OF AN INSTRUMENT OR GROUP OF INSTRUMENTS

Filed Aug. 10, 1954 7 Sheets-Sheet 4

Inventor
Edward Searles

By
[signature]
Attorney

Inventor
Edward Searles
By
Webb, Mackey & Burden
Attorney

Dec. 31, 1957 E. SEARLES 2,818,321

MEANS FOR RECORDING THE READINGS OF AN INSTRUMENT OR GROUP OF INSTRUMENTS

Filed Aug. 10, 1954 7 Sheets-Sheet 6

Inventor
Edward Searles
By
Webb, Mackey & Burden
Attorney

INVENTOR
Edward Searles
BY
Webb Mackey & Burden
ATTORNEY 2,818,321

MEANS FOR RECORDING THE READINGS OF AN INSTRUMENT OR GROUP OF INSTRUMENTS

Edward Searles, Plumstead, London, England, assignor to Southern United Telephone Cable Limited, Essex, England, a British company Application August 10, 1954, Serial No. 448,973

Claims priority, application Great Britain August 13, 1953

4 Claims. (Cl. 346—34)

This invention is concerned with the recording of readings of an instrument, or group of instruments, by the printing of the readings by means of a succession of impressions made by type on a record sheet. By "printing" here is meant the application of a mark as an ordinary printing operation or as embossing or as perforating. The result attained in this recording is the production of groups of figures with or without signs applied in appropriate positions on the record sheet.

The term "reading" is used herein as indicating a value to which an instrument, or group of instruments, is set. It is possible that the instrument may be such that a visual indication is given so that an actual reading can be taken. It is not necessary for the operation of the invention that this condition should hold and in many cases it will not do so.

The essential of a printing device to be used in the invention is that it contains a number of type-operating means, each adapted to print a sign and/or one or more numerals, either plain or in a code, and each under electromechanical control, these means being arranged in combination with a carrier for the record sheet and with means for producing relative movements between the sheet and the printing means, that is moving the position of the printing step-by-step across the sheet (spacing movement).

In apparatus embodying the invention the device by which the record is printed may be a modified typewriter. It may permit, in addition to the automatic printing, the ordinary hand operation of the keys to add type matter at will on the record sheet. The electro-mechanical control device for operating type may consist of an electro-magnet, the armature of which is attached to the lever of the type so as to pull this downward when the magnet is excited, thus giving an equivalent action to the finger on the key.

The apparatus also comprises a switching device which is set for each of the readings to be recorded to predetermine the matter to be typed and a further switching device which predetermines the position on the record sheet at which the typed matter appears, these two devices being co-ordinated so as to secure printing of each part of the matter in the correct position on the sheet. The first of the said switching devices (hereinafter called "the reading switch device") provides part circuit connections for printing one or more groups of symbols, such as figures, with or without signs. The second switching device (hereinafter called "the printing switch device") sets up part circuit connections related to the position of the carrier of the record sheet. The two sets of connections coact and thereby a circuit is established for each pair of associated positions of the two switch devices to cause the actuation of the printing means appropriate for printing a part of the reading at the desired position on the record sheet.

Examples of apparatus of the kind set out above have been described in the specifications of our applications for Letters Patent Serial Numbers 234,134, now Patent No. 2,726,130 issued Dec. 6, 1955, 344,702 filed March 26, 1953, and 356,972, now Patent No. 2,769,958, issued Nov. 6, 1956. In examples described in those specifications the reading switch device is given as a multi-point switch, or group of switches, either operating by hand or electro-mechanically, or as a set of relays and it has been arranged to set up the part circuits for the printing means which they control either directly or through the intermediary of storage relays.

In the examples described in those specifications the printing switch device has been given as a position switch and illustrated by a bank of contacts on a typewriter cooperating with a wiper, the relative motion between the two being produced by the movement of the carriage of the typewriter, so that for each position to which the carriage is brought by the spacing movement the wiper cooperates with a contact to set up a part circuit.

In accordance with the present invention the printing switch device is provided in the form of a set of relays arranged to act in sequence and to set up the required part circuits in appropriate succession. By this action in sequence the set of relays has the function of counting the steps taken to arrive at the position occupied by the carrier, starting from some first position, such as the position of commencement of a line of printing. The position of the record carrier in relation tothe starting position is determined in known manner by a spacing movement following each printing operation. The set of relays by its counting and switching action produces at each actuation the appropriate part circuit to co-operate with the part circuit set by the reading switch device so that one of the electro-magnetic printing control devices may be brought into effect at each position and cause the "printing" of a space or symbol there.

A kind of relay arrangement particularly suitable for this switching device is described in our patent application No. 418,145, filed March 23, 1954.

The invention will be further described with reference to the accompanying drawings showing, by way of example, an embodiment of the invention in an arrangement for testing the quads of a telephone cable. In the drawings.

The apparatus represented is for the automatic carrying out and recording of a sequence of tests on each of the quads of a telephone cable, the set of tests for each quad being printed in a line and in columns arranged across the width of a record sheet. Each column comprises five spaces providing for the printing of a sign (+ve or −ve), for a maximum of three digits and for a space between columns. The number of digits may vary from three to one according to the value of the reading to be recorded and it is arranged that the sign always directly precedes the first digit.

In the circuit diagrams the termination of a line in a solid triangle indicates the connection there to a source of current, the other terminal of which is earthed; where applied within a rectangle, letters indicate the coil of either a relay or an electro-magnet represented by the rectangle. The electro-magnets are indicated by the initial letter M. Contacts actuated by the relays are indicated by the corresponding letters with a suffix number.

There are included some manually operated switches. The contacts and switches are shown in the positions, referred to as the normal positions, which they occupy when the relay coils carry no current and the switches are not operated.

Figure 7:
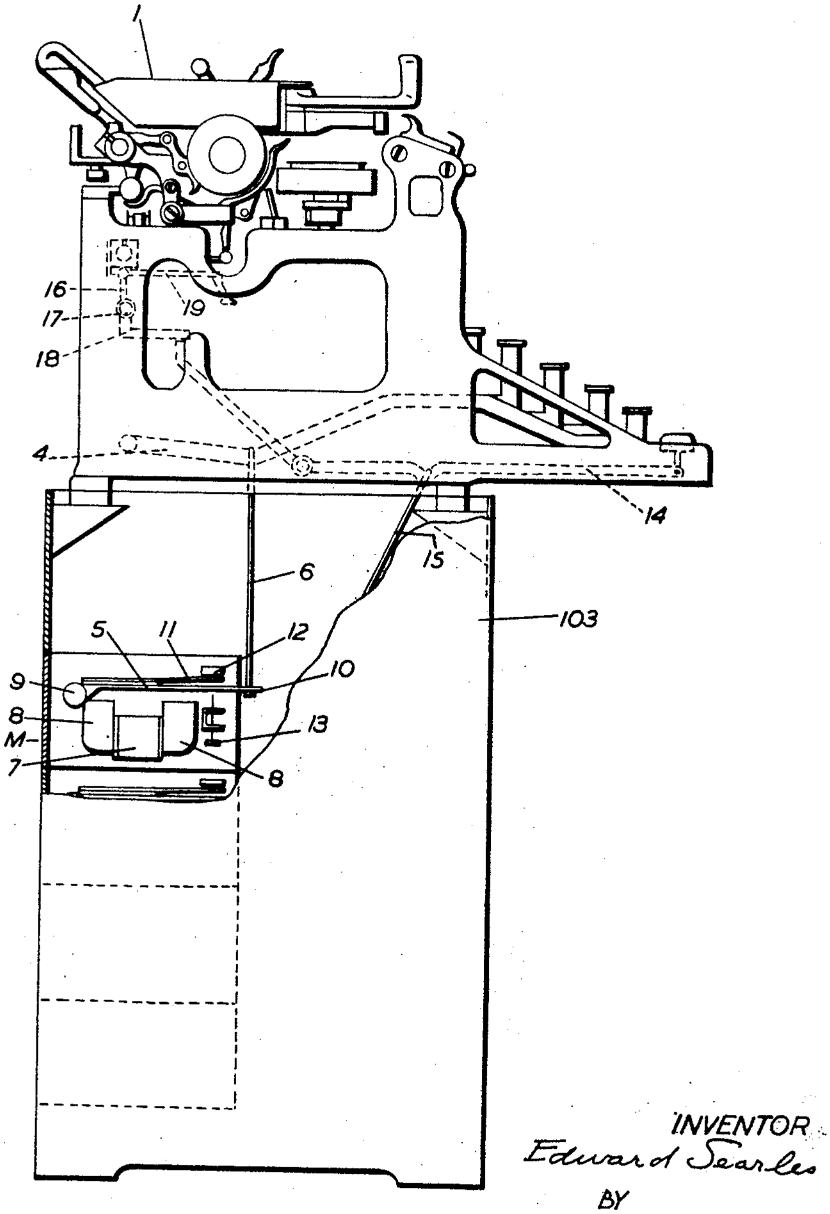
Figure 7 represents a typewriter modified to operate as the recording device.

The actual printing of the record is effected by means of the modified typewriter illustrated in Figure 7, this being generally similar to that described in the specification of our co-pending application Serial No. 234,134. The typewriter is of well-known form and for the present purpose it is only necessary to refer to the spacer operating means, the main type operating bars and the carriage. The typewriter is supported on a frame 103 in which there are mounted a number of electro-mechanically operating members which are the typing magnets and of which one, M, is illustrated in some detail. The number of these magnets M corresponds to the number of type levers and the spacer bar which are required to be automatically controlled. In the arrangement now under consideration, twelve type levers are under electromagnetic control. One of these is the lever 4 attached to the free end of an armature by means of a vertical connecting rod 6. The typing magnet M comprises the coil 7, the poles 8 and the armature 5, the latter being mounted on a pivot 9 at one end and the other end 10 being movable about the pivot 9. The armature 5 is connected at its movable end 10 with the lower end of the connecting rod 6. The armature 5 is provided with a blade spring 11 which engages a buffer 12 when the armature 5 is released. The extent of the operative movement of the armature 5 is controlled by means of an adjusting screw 13. It will be seen from the drawing that when the coil 7 is made alive the free end 10 of the armature 5 will be drawn downwards, thus depressing the type lever 4 to print a character in the usual manner. The spacer bar 14 is similarly controlled by another typing magnet, not shown, by a connecting rod 15. The typewriter carriage 1, which supports and moves a record sheet in the usual manner, is traversed step-by-step by an arrangement of tension spring and escapement mechanism which is common to the ordinary typewriter. The linkage controlling this mechanism comprises a substantially vertical lever 16 mounted on a pivot 17 at a point midway along its length. From the lower end of this lever there extends a link 18 which connects it with the spacer bar 14. From the upper end of the lever 16 there extends another link 19 connecting with the usual striker bar through which the escapement mechanism is operated when a character is printed.

Figure 1:
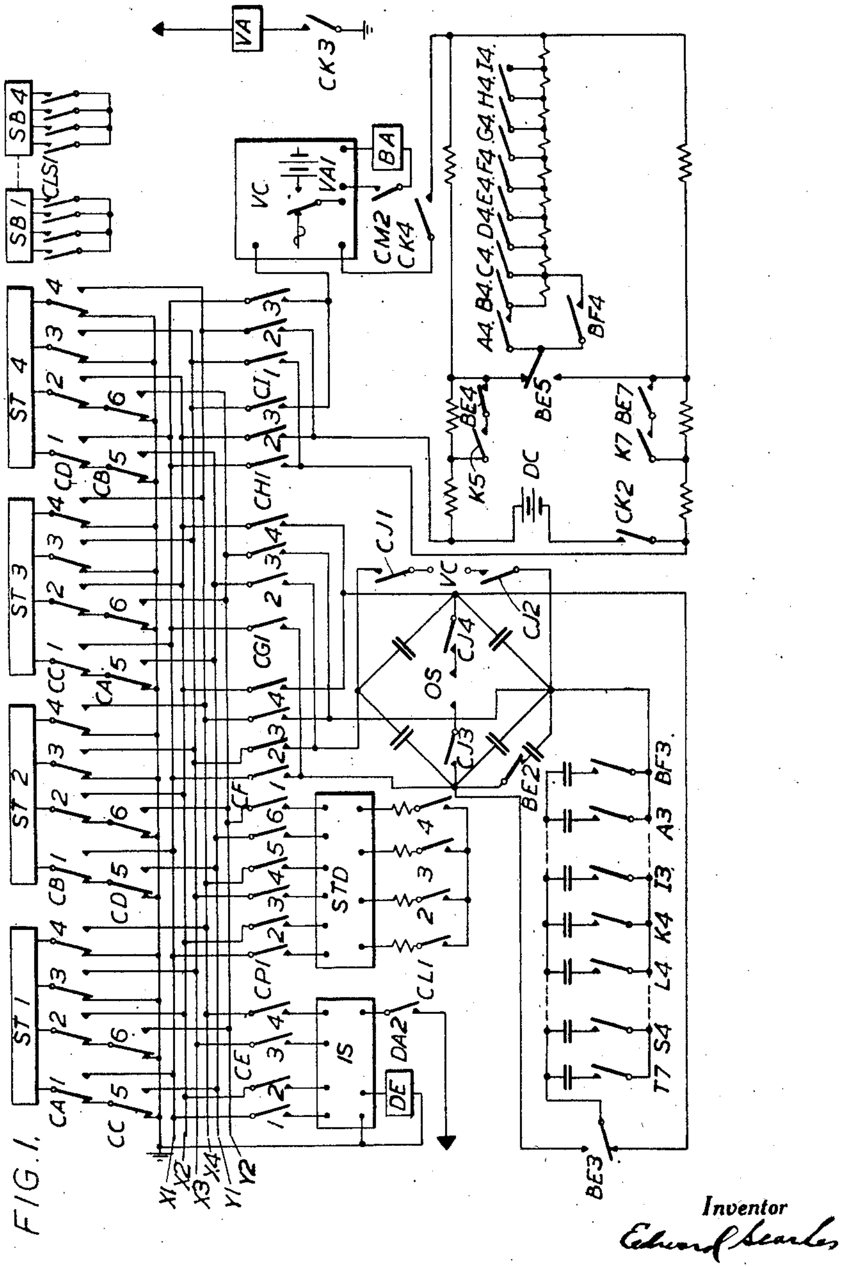
Figures 1–4 represent together the circuit diagram of the complete arrangement.
Figure 2:
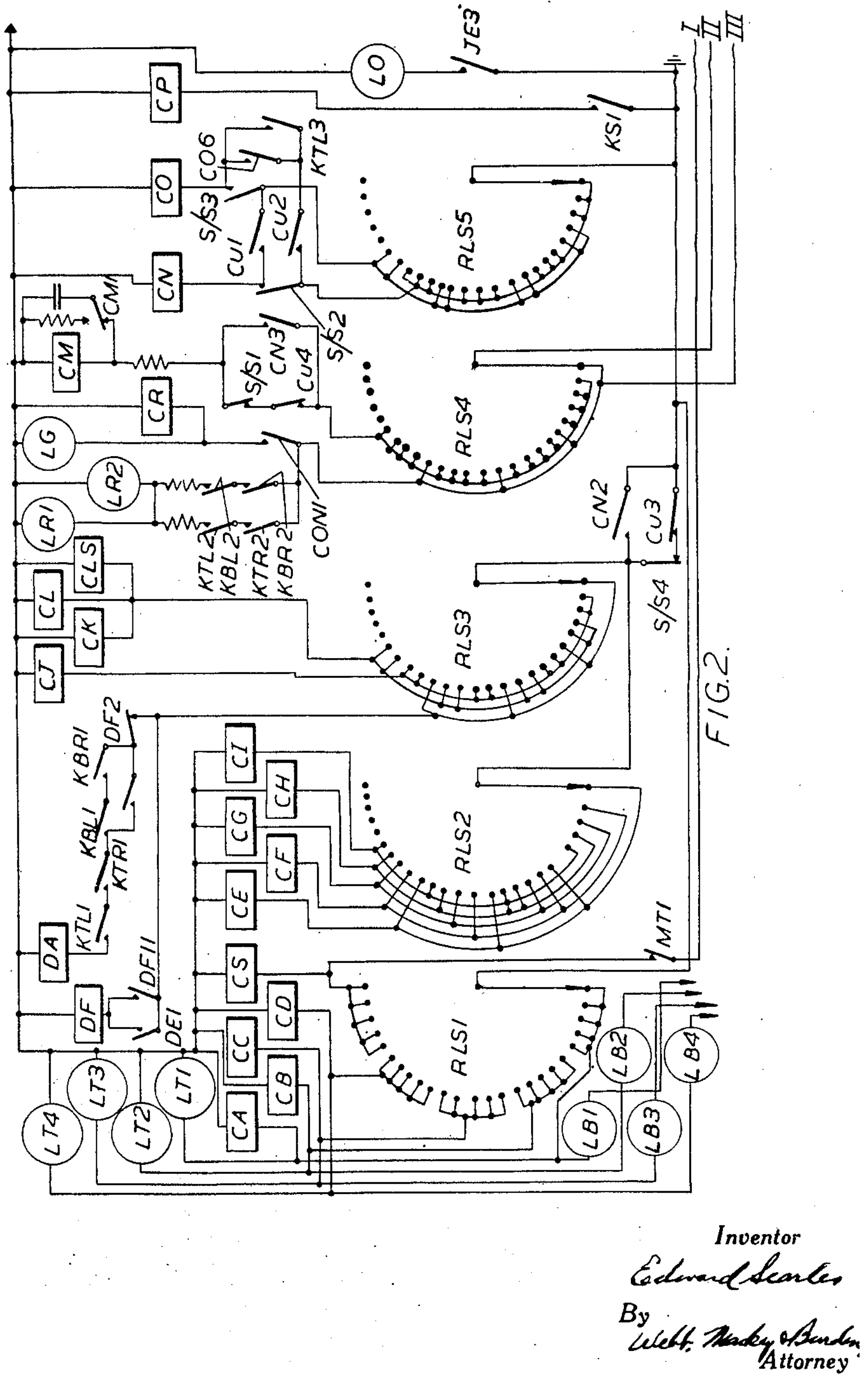
Figure 3:
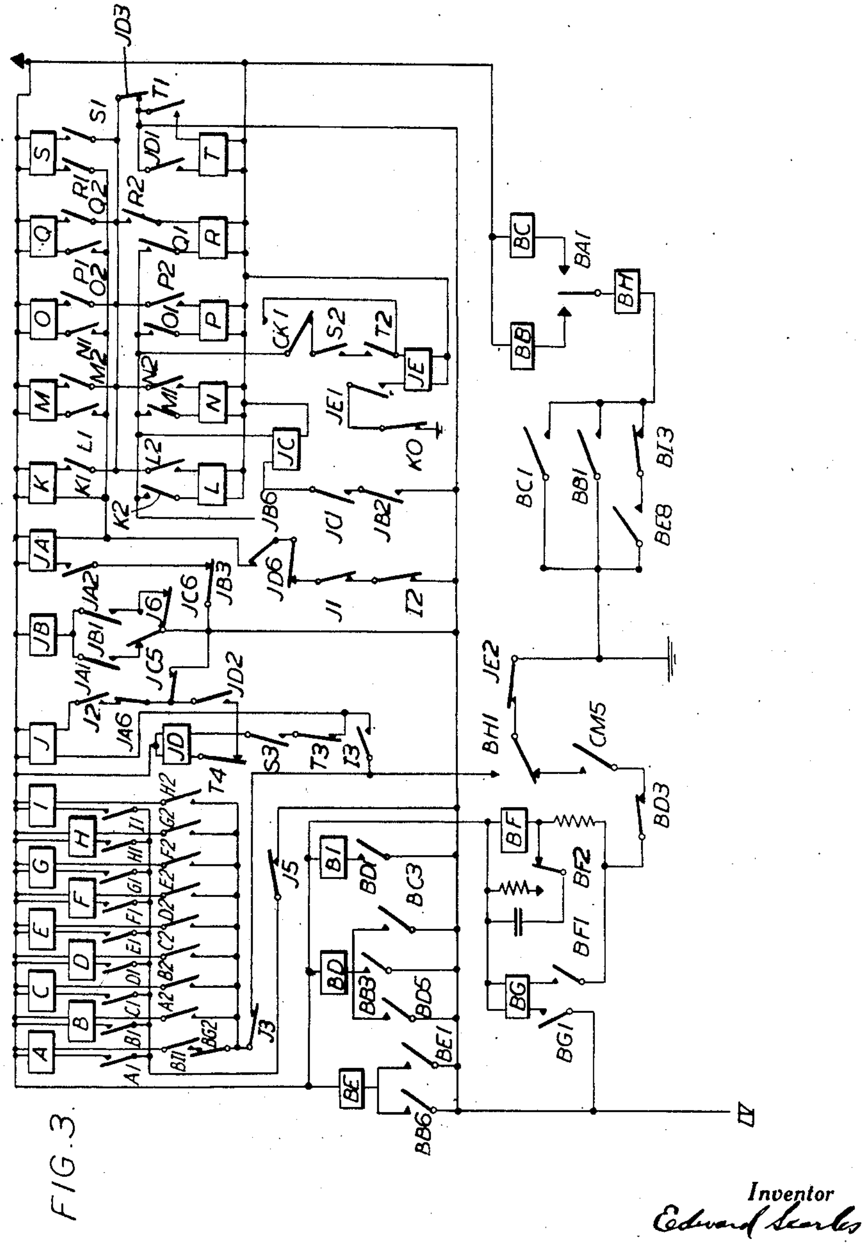
Figure 4:
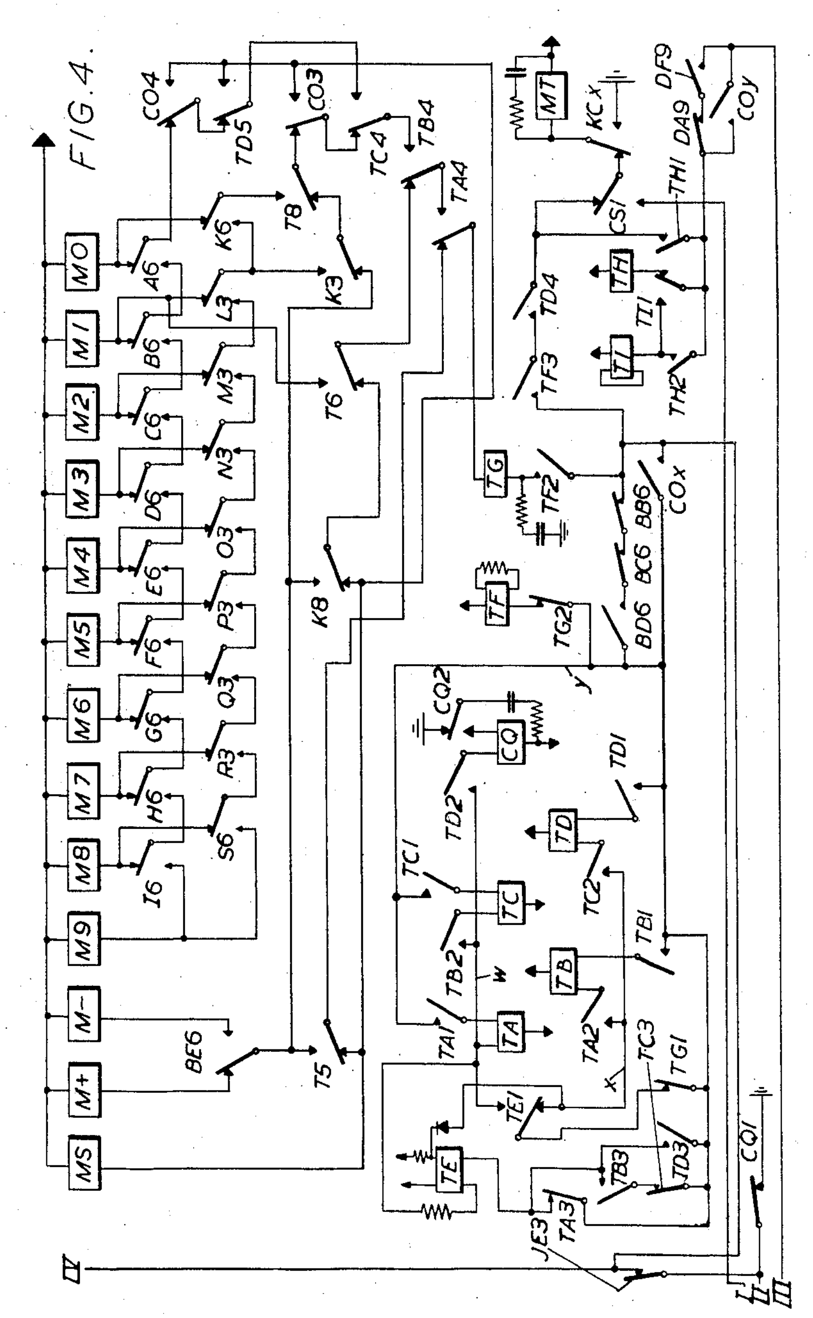

The arrangement is adapted to carry out and record similar tests to that described in the specification of our application No. 356,972 and Figures 1 and 2 of the present case are substantially the same as Figures 2 and 3 of that specification. In describing the apparatus it will be assumed that it is to be used for what is known as "core testing" of a telephone cable, that is testing of the quads, each containing four insulated conductors, after the quads have been laid up together to form the cable but before the final sheath is applied. The four tests to be recorded are one for within-quad capacity unbalance, one for inter-quad capacity unbalance and two for resistance unbalance, the first two by a capacity bridge and the last two by a resistance bridge. An insulation resistance test is also made before the other four tests, but this is not recorded; the operation of the arrangement is however automatically stopped if the insulation resistance indicates a fault. The insulation tester may be of the form described in the specification of our application Serial No. 356,973, now Patent No. 2,805,391, issued September 3, 1957. There are thus five tests to be made, the result of the first not being printed. At any given time four quads are connected to four 4-way sockets ST1–ST4 and these sockets are connected to the apparatus in turn. As the tests proceed the operator replaces the tested quads by fresh quads one at a time in the appropriate order. The selection of the appropriate 4-way sockets in turn and the selection of the circuits between each socket and the testing units is made by a step-by-step rotary switch consisting of five levels RLS1–5 (Figure 2) operated by a stepping magnet MT (Figure 4). It will be seen that at each of the levels RLS1–5 there are four groups of contacts corresponding to the four sockets ST1–4 and in each group there are five contacts corresponding to the five tests. Level RLS1 operates four relays CA–CD controlling the connections between the sockets ST1–4 and a set of bus-bars X1–4 and Y1–2. Level RLS2 controls, from each group of five contacts, five relays CE–CI which provide the connections between those bus-bars X1–4, Y1–2 and the test units, namely, to the insulation resistance tester IS at contacts CE1–4, to the capacity bridge first at contacts CF1–4 and next at contacts CG1–4, and to the resistance bridge first at contacts CH1–3 and next at contacts CI1–3. The third level RLS3 controls, through the first position in each group and manual switches KBR1, KBL1, KTR1 and KTL1, a relay DA to initiate insulation resistance testing, this relay being released at contacts DF2 when the test is satisfactory. From the second and third positions of level RLS3 relay CJ iso perated to connect to the capacity bridge through contacts CJ3 and CJ4 an A. C. supply OS and through contacts CJ1 and CJ2 a voltage comparator VC which is operative in the automatic balancing of the bridge. From the fourth and fifth positions of levels RLS3 a relay CK connects at contacts CK2 a D. C. supply and at contacts CK4 the voltage comparator VC to the capacity bridge and also by closing contacts CK3 energizes relay VA to change the two-way switch VA1 which sets the voltage comparator VC for D. C. reading. From the same positions realy CL connects, at contacts CL1–4, a group of resistors into a standard artificial quad STD to enable resistance unbalance check measurements to be taken and relay CLS short circuits, at contacts CLS1, four sockets SB1–SB4 at the remote end of the cable. The fourth level RLS4 is associated in the first position in each group with a circuit used during the step of manually initiating testing. To this first position there is connected an unlocking relay CR through contacts CON1 which are closed by the typewriter carriage when it has returned to the starting position. The unlocking relay CR is thus only energized when the typewriter carriage and the rotary relay switch are in the starting condition. The relay CR removes a lock from and permits the closing of manually operated switches KTL, KTR, KBL and KBR which are provided with contacts KTL1—KBR1 controlling the relay DA by means of which the first insulation resistance test is initiated and contact KTL2—KBR2 which complete circuits to indicator lamps LR1 and LR2. In the remaining positions this level is associated with a relay CM which completes the circuits for automatic balancing of the bridges. Relays CO and CN associated with the fifth level RLS5 are used when it is required to eliminate any tests. Relays CM, CN and CO will be referred to again.

Figure 5:
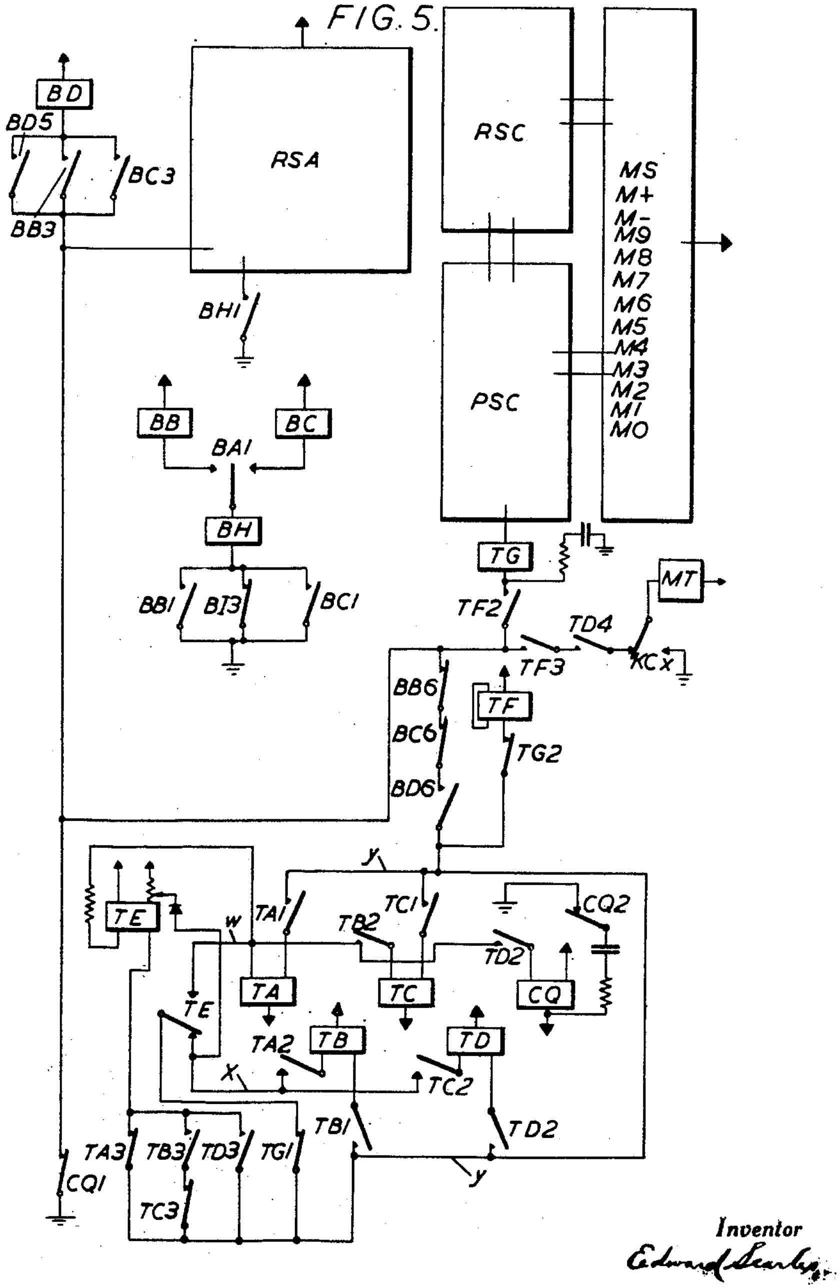
Figure 5 is block diagram of the arrangements shown in Figures 2 and 3, excluding certain details which are auxiliary to the invention.
Figure 6:
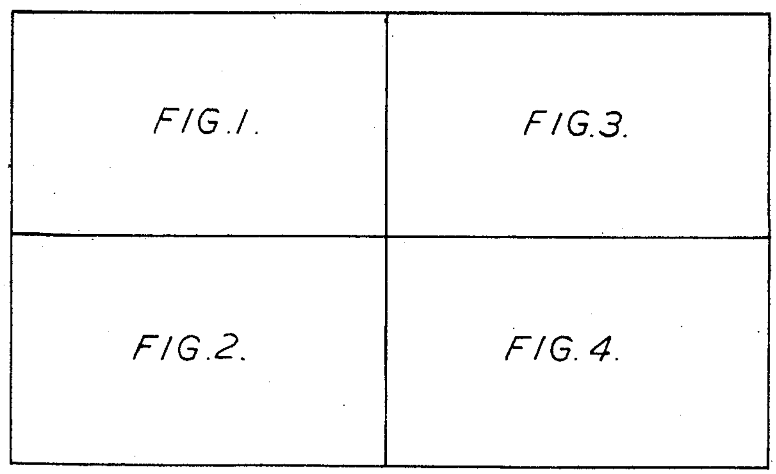
Figure 6 represents the relative arrangement of Figures 1–4 in the complete diagram.

The bridges are balanced by automatically adding to the network units of capacity or resistance by the selective operation of contacts A3—I3, K4—S4 and T7, or A4—I4, K5 and K7 respectively by a group of reading switch actuating relays A—T shown in Figure 3. (RSA in Figure 5.) The units are added either negatively or positively according to the positions of contacts BE3 and BE5 controlled by relay BE, the normal arrangement of the contacts being for positive addition. In the reading switch group relays A—I add units, relays K—S add tens, and relay T adds one hundred. Relays A—I, K—T control appropriate reading switch contacts A6—I6, K6, L3—R3, S6 (RSC in Figure 5) to prepare the circuits for those of the printing magnets M0—M9 which are required to be operated to print the reading set up by the reading switch actuating relays A—T. On being operated in the manner indicated below these magnets print the appropriate digits in the correct positions on a record sheet.

Relays K and T also control the appropriate contacts of the group K3, K6, K8, T5, T6 and T8 to obtain the printing of the sign in the required column according to the number of figures in the reading. Positive and negative signs and a space are printed by magnets M+, M− and MS respectively, the sign to be printed being determined by the condition of the two-way contacts BE6 which select the positive magnet M+ in the normal position and the negative magnet M− in the operative position.

The reading switch relays J—JD effect the transference of the operative condition between the units, tens and hundred relays, and relay JE serves by opening contacts JE2 to stop the automatic operation of the apparatus if the reading is in excess of the range of the device. The working of the reading switch relays is automatically initiated by change-over contacts BH1 and terminated by those contacts returning to normal when balance of a bridge is attained. The relays set the reading switch contacts which, in conjunction with printing switch contacts TA4, TB4, TC4 and TD5, compose the circuits for the printing magnets which, when concluded in the manner to be hereinafter described, provide for the actuation in succession of the printing magnets to record in the appropriate place on the record sheet the value set by the reading switch actuation relays when balance is attained.

The operation of the reading switch relays shown in Figure 3 and of the arrangements shown in Figures 1 and 2 has been described in detail in the specification of our above-mentioned application Serial No. 356,972 and will only be referred to hereinafter where necessary in connection with the present invention.

When the appropriate connections have been made for one of the bridge tests on a quad the out-of-balance condition initially present causes the central movable contact BA1 of the sensitive relay BA (Fig. 3) to be deflected to one side or the other depending upon the out-of-balance being either positive or negative. When balance is attained the relay BA restores this contact to the central position. Deflection of contact BA1 closes the circuit of either relay BB or BC (by way of closed contacts BE8 and B13) and relay BD then is excited due to the closing of contacts BB3 or BC3. At the same time relay BH operates in series with either relay BB or BC and changes contacts BH1 to provide through closed contacts JE2 the operating earth of the reading switch actuation relays. These contacts BH1, accordingly, remain operated during the whole process of attaining balance of the bridge and then open with the release of relay BH thereby preventing any further actuation of reading switch relays. The operated relays are, however, held operated by the holding earth wire through the normally closed contacts JE3 and CQ1 (Figure 4).

Relay BD having operated holds itself at contacts BD5. Accordingly, the position at the end of the test is that the reading switch contacts have been set and are held, the relays BB and BC are released and the relay BD is operated. These latter conditions establish a circuit shown in Figure 4 through the relay TF, by way of contacts TG2, BD6, BC6, BB6, JE3 and CQ1 to earth. The operation of relay TF closes contacts TF2 and thereby makes the circuit of the relay TG. Relay TG opens contacts TG2 and thereby releases relay TF so that contacts TF2 re-open. Relay TG then releases and contacts TG2 reclose, thus restoring the original condition.

It will be seen that the combination of relays TF and TG produces automatically an operating and releasing cycle, the frequency of which is determined by the operating time for the relay TF, a winding of which is short circuited through a resistance. Each operation of the relay TG is accompanied by the operation of a printing magnet connected in series with it. It also opens the contacts TG1 in a printing switch group of relays TA—TE, CQ so that as long as the earth circuit conditions of TF remain as previously described these contacts TG1 continually open and close at the frequency of operation of the relay TG.

The group of printing switch relays, which is of the type described in specification No. 418,145 previously mentioned herein, comprises a change-over relay TE operating the change-over switch TE1, three odd relays TA, TC and CQ and two even relays TB and TD. The odd relays are arranged to be connected with the odd line $w$ and the even relays with the even line $x$. The holding earth line $y$ serves all the relays of this group except CQ. The printing switch relays control printing switch contacts TA4, TB4, TC4 and TD5 (PSC in Figure 5) in the circuits to the printing magnets.

In the initial conditions the circuit through normally closed contacts TA3 of one winding of the relay TE is inoperative, although a circuit exists by way of contacts BD6, BC6, BB6, JE3 and CQ1, because the winding is short-circuited by the contacts TE1 and TG1. The effect of the first operation of relay TG above mentioned is, therefore, to remove this short circuit by opening contacts TG1 which causes the relay TE to operate and the contacts TE1 to change over to the odd line $w$. Then when following the operation of relay TF the relay TG releases contacts TG1 complete the earth circuit of the relay TA through the upper contact of the change-over contacts TE1 and contacts TG2. Relay TA then holds at contacts TA1 and opens contacts at TA3 in series with one of the windings of relay TE. This relay, however, does not release because the circuit of its second winding has been made by way of change-over contacts TE1.

At the next operation of relay TG the opening of contacts TG1 breaks this circuit of relay TE and causes the change-over contacts TE1 to move to the lower position thus preparing the circuit of the even relay TB with the aid of contacts TA2 closed by the operation of relay TA.

At the release of relay TG the circuit of this even relay TB is completed at contacts TG1 and the relay operates, holding at contacts TB1, preparing the circuit of the odd relay TC at contacts TB2 and preparing a circuit for the first winding of relay TE at contacts TB3. Relay TE, however, does not operate because of the short circuit provided by contacts TG1.

When relay TG next operates this short circuit is removed, the change-over contacts TE1 go to the upper position and, on release of relay TG, odd relay TC operates, holding in at contacts TC1, preparing the circuit for the even relay TD at contacts TC2 and opening the circuit of the first winding of relay TE at contacts TC3. This last causes relay TE to release when relay TG operates and the change-over contacts TE1 then move to the lower position.

At the next release of relay TG the circuit of the even relay TD is completed by the contacts TG1 and the relay TD operates, holding at contacts TD1, preparing a circuit for relay CQ at contacts TD2 and again pretacts TD3; this winding of relay TE being short-circuited does not operate.

At the next operation of relay TG contacts TG1 are opened and the change-over contacts TE1 go to the upper position causing the odd relay CQ to operate on release of relay TG. Relay CQ has the effect of clearing all the circuits by opening the earth circuit at contacts CQ1; at the same time it closes its own winding at contacts CQ2 by the capacitor and resistor circuit which maintains the relay in operation for a short time by the discharge of the capacitor. The effect of the opening of the contacts CQ1 is to open the holding earth wire circuit to release all the printing switch relays, the relay BD and the relays of the reading switch actuation.

Before the clearing of these relays the stepping magnet MT has been operated by way of contacts TF3 and TD4 at the last operation of the relay TF. This magnet MT moves the test sequence switch through one step to change over the connections, by relays operated from levels RLS1 and RLS2, of the quad under test from one test to the next so that after clearing of the relays the next test automatically commences. After the operation of the magnet MT for the number of times corresponding to the number of tests to be made on each quad, relay CM is released from switch level RLS4 and this causes contacts CM2 in series with the coil of relay BA (Figure 1) to open so that the arrangements for obtaining balance and printing the test record are out of action during insulation testing. Where the rotary switch has moved into the first position in one of the groups of contacts representing tests on the four sockets ST1–ST4, the insulation testing of the next quad proceeds followed by the remaining four tests to be recorded. Where, however, the rotary switch has moved into a position outside these groups the action is modified as described hereinafter.

From the preceding description it will be seen that by the co-operation of the relays TF and TG with the printing switch relays five pulses have been fed to the printing magnets. At each pulse the appropriate printing magnet will operate to print the appropriate symbol in the position across the record sheet corresponding to that pulse. The record sheet being on the typewriter carriage will have been at the starting postiion at the beginning of the tests. By means of the typewriter mechanism the carriage will move one step at each printing operation so that in printing four tests it will move through twenty positions and always be in the correct position for printing each sign, digit or space.

In each reading, at the first pulse a printing magnet will be operated in series with relay TG through contacts TA4 in the normal position, the magnet being either the space magnet MS or a sign magnet M— or M+ selected by the reading switch contacts T5. At the second pulse, the printing switch contacts TA4 are operated by relay TA (itself operated at the preceding release of relay TG) to provide a circuit, through contacts TB4 in the normal condition, to the space magnet MS through contacts T6 and K8 both normal, a sign magnet M— or M+ through contacts T6 normal and T5 operated or the magnet M1 when contacts T6 are operated to print the digit 1. At the third pulse through the operated contacts TA4 and TB4 and the normal contacts TC4 either a sign magnet or a figure magnet is operated depending upon whether or not contacts T8 have operated. At the fourth impulse a figure is printed through circuits to the appropriate magnets through the operated contacts TA4, TB4, TC4 and the normal contacts TD5 and CO5. At the fifth pulse the operated contacts TD5 always provide a circuit for operating the space magnet MS in the fifth, that is the last, position. With the exception of the fifth operation, it will be seen that in each position the appropriate printing magnets are operated by pulses routed by the printing switch contacts through circuits selected by the reading switch contacts.

It is necessary for the stepping magnet MT to operate after the unrecorded insulation test. This is effected by means of relays T1 and TH. At the end of the insulation test relay DF operates to close contacts DF9, and the relay DA (which closed to initiate the test) is released to reclose contacts DA9 and completes an operating earth circuit for relay TH from switch level RLS4 through contacts TI1. This closes contacts TH1 to complete the circuit to magnet MT. A circuit is also made through contacts TH2 to a slow-operating relay T1 which, on operating, changes contacts TI1 to hold itself operated and release relay TH. The latter breaks the circuit to the stepping magnet MT at contacts TH1, and when the rotary switch is moved off the first position the holding circuit for relay TI is broken at switch level RLS4. The rotary switch may be stepped manually by connecting the stepping magnet MT to earth at switch KC*x* and appropriately closing and opening this switch. When the tests on the four quads are completed it is necessary to cause the rotary switch to return to the initial position. This is controlled by relay CS, associated with switch level RLS1, which operates to alter the position of contacts CS1 to provide a circuit to the stepping magnet MT via its own contacts MT1 from that level. When it is required to eliminate any tests a relay CO is operated from switch level RLS5. This closes contacts CO*y* to provide an operating earth for the relays TI and TH which operate the stepping magnet in the manner described. It also closes contacts CO*x* to provide an earth for operating the printing switch relays. Since the reading switch actuating relays are not effective in this case the space magnet MS will be operated in each position across the column corresponding to the eliminated test or tests.

What I claim as my invention is:

1. Apparatus for recording the readings of an instrument as a succession of printed symbols on a record sheet, comprising a step-by-step movable carrier for the record sheet, a number of electro-mechanically operated printing devices each adapted to print a predetermined symbol, means operable by each printing device for producing movement of the carrier through one step, operating circuits for said printing devices, a set of relays, constituting a reading relay group, responsive sequentially to the instrument reading to select those of said operating circuits which correspond to the symbols to be printed for each reading, signal transmitting circuits for selection sequentially one at a time to route operating signals to the selected operating circuits, a printing switch relay group for selecting in sequence the signal transmitting circuits, said printing switch relay group being a set of relays energizable one at a time in sequence by signal impulses, two pulsing relays interconnected to operate and release cyclically in sequence to generate said signal impulses, a circuit including one of said pulsing relays for feeding an operating signal into one of said operating circuits through one of said signal transmitting circuits at each energizing of the said impulse relay, and a final operating relay in said printing switch relay group to restore the reading and printing switch relay groups to an initial non-operated condition.

2. Apparatus for recording the readings of an instrument as a succession of printed symbols on a record sheet, comprising a step-by-step movable carrier for the record sheet, a number of electro-mechanically operated printing devices each adapted to print a predetermined symbol, means operable by each printing device for producing movement of the carrier through one step, operating circuits for said printing devices, a set of relays, constituting a reading relay group, responsive sequentially to the instrument reading to select those of said operating circuits which correspond to the symbols to be printed for each reading, signal transmitting circuits for selection sequentially one at a time to route operating signals to the selected operating circuits, a printing switch relay group for selecting in sequence the signal transmitting circuits, said printing switch relay group being a set of relays energizable one at a time in sequence by signal impulses, two pulsing relays interconnected to operate and release cyclically in sequence to generate said signal impulses, a circuit including one of said pulsing relays for feeding an operating signal into one of said operating circuits through one of said signal transmitting circuits at each energizing of the said impulse relay, a pulsing relay control circuit responsive to the reading relay group to initiate the pulse generation, and means for completing said control circuit at the completion, by the said reading relay group, of the selection of the said operating circuits.

3. Apparatus for recording in succession the readings of a series of instruments as a succession of printed symbols on a record sheet, comprising a step-by-step movable carrier for the record sheet, a number of electro-mechanically operated printing devices each adapted to print a predetermined symbol, means operable by each printing device for producing movement of the carrier through one step, operating circuits for said printing devices, a set of relays, constituting a reading relay group, responsive sequentially to the instrument reading to select those of said operating circuits which correspond to the symbols to be printed for each reading, signal transmitting circuits for selection sequentially one at a time to route operating signals to the selected operating circuits, a printing switch relay group for selecting in sequence the signal transmitting circuits, said printing switch relay group being a set of relays energizable one at a time in sequence by signal impulses, two pulsing relays interconnected to operate and release cyclically in sequence to generate said signal impulses, a circuit including one of said pulsing relays for feeding an operating signal into one of said operating circuits through one of said signal transmitting circuits at each energizing of the said impulse relay, and switching means responsive to the final operation of said pulsing relays at the end of the recording of a reading of each instrument to connect the reading relay group to the next instrument in the series.

4. Apparatus as claimed in claim 1 in which the instrument to be recorded is the variable component of a bridge network, the said variable component is a number of fixed value components for addition in succession to the said network by switches controlled by the reading relay group, and there is provided a balance relay group responsive to the output from the bridge network to stop the operation of the said reading relay group and complete a starting circuit for the pulsing relays when the bridge is balanced.

References Cited in the file of this patent

UNITED STATES PATENTS

| | | |
|---|---|---|
| 2,366,913 | LeClair | Jan. 9, 1945 |
| 2,701,748 | Anderson | Feb. 8, 1955 |

U. S. DEPARTMENT OF COMMERCE

PATENT OFFICE

CERTIFICATE OF CORRECTION

Patent No. 2,818,321 December 31, 1957

Edward Searles

It is hereby certified that error appears in the printed specification of the above numbered patent requiring correction and that the said Letters Patent should read as corrected below.

Column 4, line 33, for "realy" read -- relay --; column 6, line 26, for "TG2" read -- TG1 --; line 57, after "again pre-" insert -- paring a circuit for the first winding of relay TE at con- --.

Signed and sealed this 11th day of March 1958.

(SEAL)
Attest:
KARL H. AXLINE
Attesting Officer

ROBERT C. WATSON
Commissioner of Patents